United States Patent [19]

Gabbitas

[11] 4,200,870
[45] Apr. 29, 1980

[54] MICROWAVE COMPONENTS

[75] Inventor: Colin Gabbitas, Malmesbury, England

[73] Assignee: Bridgend Processes Limited, London, England

[21] Appl. No.: 950,163

[22] Filed: Oct. 10, 1978

[51] Int. Cl.² .............................................. G01S 9/02
[52] U.S. Cl. ................................... 343/5 PD; 343/786
[58] Field of Search ............... 343/5 PD, 8, 12 A, 786

[56] References Cited

U.S. PATENT DOCUMENTS

| | | | |
|---|---|---|---|
| 3,098,225 | 7/1963 | Anderson | 343/12 A |
| 3,659,293 | 4/1972 | Gupta | 343/8 X |
| 4,042,934 | 8/1977 | Davis | 343/5 PD X |
| 4,053,897 | 10/1977 | Nerheim | 343/5 PD X |

FOREIGN PATENT DOCUMENTS 1416620  12/1975  United Kingdom ........................ 343/8

Primary Examiner—T. H. Tubbesing
Attorney, Agent, or Firm—Lawrence E. Laubscher

[57] ABSTRACT

A microwave transmitter/receiver unit consisting of a hollow waveguide member closed at one end and open at the other is divided longitudinally by an internal dividing plate into two waveguides, one for transmitting microwave radiation to the open end and the other for receiving such radiation from the open end. A Gunn diode is mounted in a cavity in the transmitting waveguide and at least one detector diode is mounted in the receiving waveguide. The unit is of an inherently compact nature and has particular application to doppler radars, two way communication links and distance measuring radars.

15 Claims, 9 Drawing Figures

MICROWAVE COMPONENTS

FIELD OF THE INVENTION

This invention concerns an improved microwave transmitter/receiver unit useful in radar applications such as for example sensing vehicle speeds and their direction of travel, in security systems such as for intruder detection for example, and in line of sight communication systems for example.

BACKGROUND TO THE INVENTION

It is well known that microwave intruder alarms and other microwave systems such as duplex communication links have been produced with a common antenna connected to both a transmitter and a receiver. For example, in microwave intruder alarms, it has been proposed that a microwave transmitter and receiver be connected to a common antenna such that the receiver senses doppler shifted returns from the transmitter radiation in the presence of a moving object. A disadvantage of such prior proposals is that they have required relatively complex microwave waveguide plumbing arrangements in order to achieve satisfactory performance with a common antenna, such complex arrangements leading necessarily to a physical structure which is complex and uncompact in nature.

SUMMARY OF THE INVENTION

It is an object of the present invention to provide a more compact and less complicated microwave transmitter and receiver unit suitable for use with a common transmit/receive antenna.

In accordance with my invention, a microwave transmitter/receiver unit is formed in an elongate hollow waveguide member which is closed at one end and open at the other end for transmitting and receiving microwave energy to a common transmit/receive antenna. A plate extends longitudinally within the waveguide member and divides it into two waveguides one for transmitting microwave radiation from the open end of the member into the antenna and the other waveguide being for receiving microwave radiation from the antenna through the open end of the member. A microwave oscillator diode is mounted in the transmitting waveguide between the dividing plate and an opposing wall of the waveguide member, the transmitting waveguide also including means defining a resonant cavity for the diode so as to launch microwave radiation into the transmitting waveguide. A microwave detector diode is mounted in the receiving waveguide between the dividing plate and an opposing wall of the waveguide member.

The microwave transmitter/receiver of the invention can be constructed as an extremely compact unit. For example, in one embodiment of my invention the waveguide member has a rectangular transverse section of approximate dimension 1×2.3 cm, and a length of approximately 6.5 cm. The compact nature of the unit is particularly advantageous in doppler radar intruder alarm applications, because it allows the radar to be hidden within the building thereby enhancing the security of the system.

The common antenna can typically be a conventional horn antenna but can also comprise a wedge shaped block of dielectric, for example synthetic plastics material as will be explained in more detail hereinafter.

Furthermore, means may if desired be provided to enable an injection of microwave radiation from the transmission waveguide to the receiving waveguide, for example in a doppler radar application to provide a reference source frequency to the detector cavity for heterodyning purposes; such means may conveniently comprise a post mounted in a wall of the waveguide member and arranged to project, through an aperture in the dividing plate and, to enable adjustment of the amount of injection from the transmitting to the receiving waveguide, the post preferably is arranged so that the extent of its projection into the waveguide member is adjustable.

Also, two detector diodes can be mounted in the receiving waveguide. The relative phase of the signals produced by the detector diodes can then be compared to indicate the phase of the doppler shift of the returns and hence the direction of movement of the detected object.

The microwave oscillator diode can conveniently comprise a Gunn effect diode and the one or more detector diodes can be of the Schottky barrier type for example. A convenient arrangement for removably mounting the diodes has each diode resiliently retained by means of a resilient packing piece or spring held in position by a screw threaded cap, apertured to pass a lead to the respective diode, engaged on the screw-threaded end of an access collar formed on and providing access through an appropriate part of the wall of the waveguide member. In this arrangement, all diodes are grounded to the waveguide dividing plate.

Preferably means are provided to tune the resonant frequency of the microwave oscillator diode and for example an adjustable reactance constituted by a screw threaded post mounted in a wall of the waveguide member so as to extend into the transmitting waveguide; a similar adjustable post can be provided in the receiving waveguide to tune the detector diode.

BRIEF DESCRIPTION OF THE DRAWINGS

Further features and advantages of the invention will become apparent from the following description of preferred embodiments thereof given by way of example with reference to the accompanying drawings in which:

Referring to FIG. 1, there is shown a rectangular microwave waveguide member having a closed end 1 and an open end 2 which may, for example, be formed integrally with a horn antenna 2a. An internal dividing plate 3 defines, in the closed end 1, two waveguides 4 and 5 isolated from one another by the plate 3. The plate 3 may, for example, be slotted into the waveguide member and conveniently can be arranged to project externally thereof to provide fixing lugs for mounting purposes.

Figure 1:
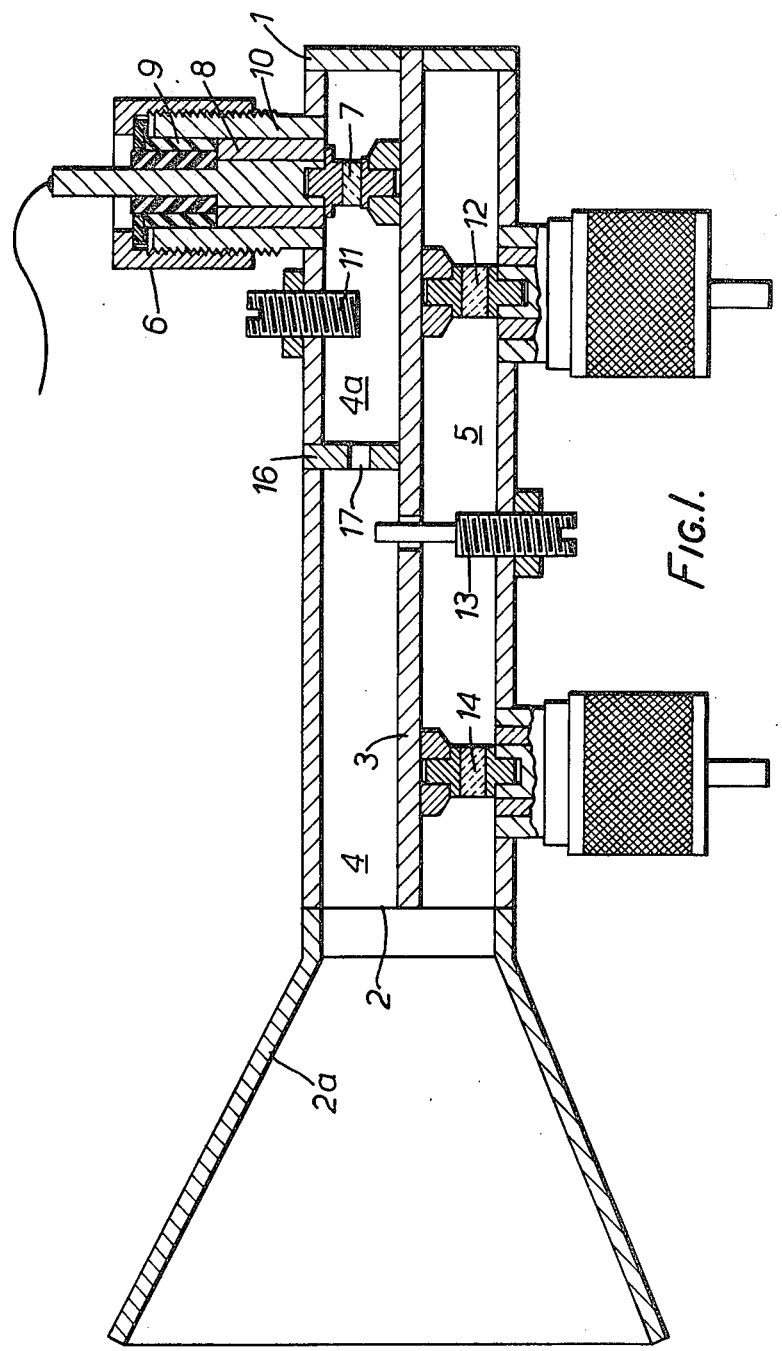
FIG. 1 is a transverse sectional view of a first embodiment of a microwave transmitter/receiver unit in accordance with my invention.

The waveguide 4 is for transmitting microwave radiation to the open end 2 of the member and has a source of microwave radiation 6, constituted by a Gunn effect oscillator diode 7, mounted therein between the dividing plate 3 and an opposing wall of the waveguide member. The mounting arrangement has the diode 7 retained in an anodised aluminium feed-through bush 8 held by means of a resilient packing piece or spring 9 in a mounting enclosure defined by a screw-threadedly capped access collar 10 formed on a wall of the waveguide member. As shown, electrical connection to the diode 7 is made through an aperture in the cap of the access collar 10 and the diode is grounded through the plate 3.

A screw-threadedly adjustable tuning post 11 is provided in the waveguide 4 as shown to enable oscillator tuning.

An enclosing plate 16, is let into the transmitting waveguide 4 at right angles to the dividing plate 3. The internal dimensions of the cavity 4a thereby formed assist in defining the operating frequency of the oscillator, which in this example is in the x-band. An aperture 17, let into plate 16 controls the amount of wave energy to be coupled from the cavity 4a and propagated along the waveguide 4.

The waveguide 5 is for receiving microwave radiation from the open end 2 of the member and has mounted therein a detector diode 12 which as shown is secured in a mounting enclosure similar to that retaining the oscillator diode in the cavity 4a. Electrical connection to the detector diode 12 is made, as with the oscillator diode 7, through an aperture in the mounting enclosure cap, and the diode 12 is grounded on plate 3.

A screw-threadedly adjustable post 13 is provided as shown forward of the two diodes 7 and 12 in the waveguide section. This post 13 provides an adjustable amount of injection of microwave energy directly from the oscillator section into the detector cavity 5. The usefulness of such injection in, for example, doppler radar applications, will be readily appreciated.

In operation of the illustrated arrangement, with a suitable operating potential applied to the oscillator diode, the resonant cavity 4a functions as a source of microwave radiation which is transmitted out of the open end 2 of the waveguide member. Reflected radiation is received by the waveguide 5 and a representative output signal is obtained from the detector diode 12. The arrangement will be seen to constitute a particularly convenient microwave transceiver.

FIG. 1 also shows the optional addition of another detector diode 14 which provides for phase sensing detection of doppler target signals. The transmitting waveguide 4 is as described previously, but the receiving waveguide can be seen to contain an additional detector diode 14 separated from diode 12 by a distance equivalent to a significant number of quarter guide wave lengths. The screw-threadedly adjustable post 13 is positioned at a point centrally between the two detector diodes. The end of the post is reduced in diameter to enable it to protrude through a hole in the dividing plate 3. This post 13 provides an adjustable amount of injection of microwave reference energy directly from the oscillator cavity section into the mid point between the two detector diodes.

This arrangement will be seen to constitute a particularly convenient microwave transmitter and phase sensitive receiver whereby the phase angle of signal detection can be so defined as to provide, for example, indication of moving target direction, or reduction of the effects of spurious oscillator modulation or any other manner of signal detection where signal phase relationships are significant.

Figure 2:
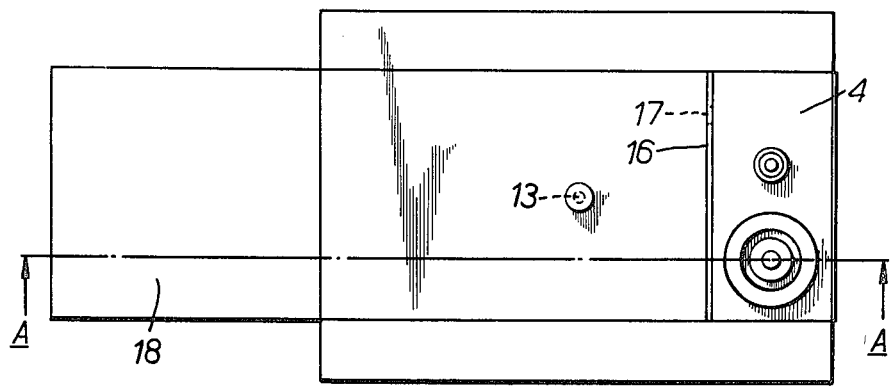
FIG. 2 is a top plan view of another embodiment of microwave transmitter/receiver unit in accordance with the present invention.
Figure 3:
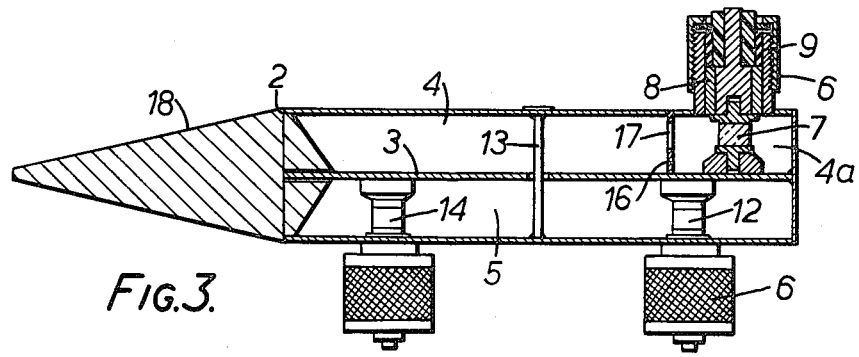
FIG. 3 is a transverse sectional view taken along the line A—A of FIG. 2.
Figure 4:
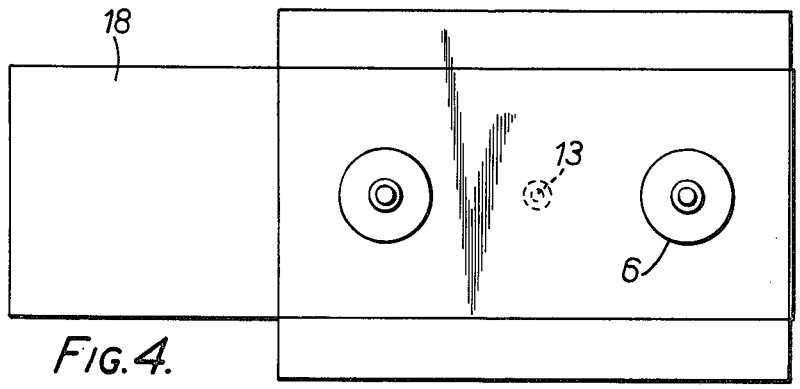
FIG. 4 is a bottom plan view of the unit of FIG. 2.

Referring now to FIGS. 2 to 4 there is shown another example of a transmitter/receiver unit in accordance with the invention. The construction of the unit is broadly similar to that shown in FIG. 1 and like parts are marked with like reference numerals. The unit of FIGS. 2 to 4 is adapted to operate in the J-band and the arrangement of the plate 16, the aperture 17 and the Gunn effect diode 7 is such that the cavity 4a is of appropriate configuration to launch a J-band microwave radiation in the cavity 4a transversely to the length of the waveguide member; the radiation passing out into the transmitting waveguide 4 through the aperture 17.

The common antenna consists of a wedged shaped block 18 of synthetic plastics material which has a generally fan shaped directive pattern. The block 18 is useful in intruder alarm applications since it is cheap to manufacture compared with the form antenna previously described. The block 18 can be formed by moulding and is press-fitted into the open end 2 of the waveguide member. The post 13 shown in FIGS. 2 to 4 is for heterodyning the transmitted wave with the radar returns as described previously such that the diodes 12, 14 detect doppler shifts produced by moving targets lying in the directive pattern of the aerial, the post however being a fixed member rather than adjustable as shown in FIG. 1.

From the foregoing, it will be readily apparent to those skilled in the art that the unit of the invention can be made as a compact device. Typically, the generally rectangular waveguide member of the described embodiments has external dimensions 1×2.3×6.5 cm. Clearly, this provides for a very small unit which can easily be hidden in a building for intruder alarm purposes, and which is light and easily portable for line of sight communication and other radar purposes.

Figure 5:
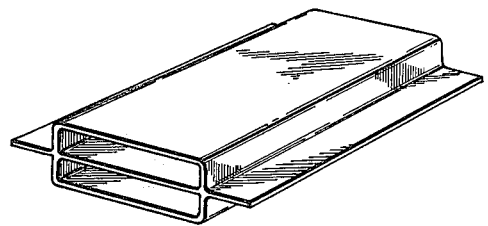
FIG. 5 is a perspective view of a portion of an aluminium extrusion for use in making the waveguide member.

I have found that the waveguide member and the associated dividing plate 3 can be constructed in a very simple way by forming an aluminium extrusion as shown in FIG. 5, fitting a closure plate to one end of a portion of the extrusion to form the closed end 1, and fitting the diodes and posts in the manner shown in FIG. 1 or FIGS. 2 to 4.

Figure 6:
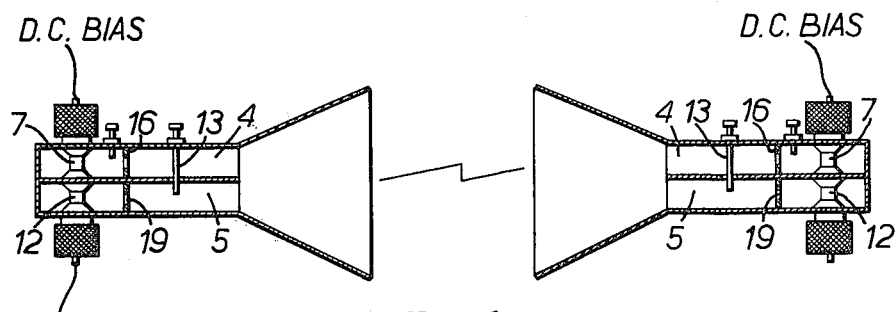
FIGS. 6 to 8 illustrate schematically uses of transmitter/receiver units of the invention in line of sight communication applications.

Some examples of line of sight microwave communication links established by pairs of units of the invention will now be described. Referring now to FIG. 6, there is shown a pair of microwave transmitter/receiver units of the invention defining a communication link. Each of the units of FIG. 6 is substantially similar to the unit described with reference to FIG. 1 and includes a Gunn oscillator diode 7 within a cavity defined by the apertured plate 16. A detector diode 12 is provided within a tuned cavity defined by an apertured plate 19 similar to the plate 16. The post 13 provides for selective coupling between the transmitter and receiving of waveguides 4, 5 for heterodyning.

Transmission of information from the left hand unit to the right hand unit will now be described. A d.c. bias is applied to the Gunn diodes 7 of the units to cause them to oscillate. The d.c. bias applied to the left hand unit is modulated with information to be transmitted along the link so as to cause the microwave carrier produced by the diode to be frequency modulated with for example an I/F, A/F or video signal. The Gunn diode 7 in the right hand unit acts as a local oscillator and its reference frequency is coupled from the waveguide 4 into the waveguide 5 of the right hand unit where it is mixed with the modulated carrier received from the left hand unit. The mixing of the signals results in the detector diode 12 of the right hand unit detecting the I/F, A/F or video signal, which is then passed to an appropriate amplifier (not shown).

For transmission of information from the right hand unit to the left hand unit, the d.c. bias of the Gunn diode 7 of the right hand unit is modulated in accordance with the information to be transmitted and the Gunn diode of the left hand unit provides a reference oscillation which is heterodyned by means of the post 13 with the modulated carrier received in the waveguide 5 of the left hand unit such that the detector diode 12 of the left hand unit detects the modulation and hence the transmitted information.

In another mode of operation, the detector diodes 12 could operate as crystal video detectors in which case the Gunn diodes would not need to function as local oscillators for heterodyning but would only be required to produce a carrier wave for the link.

Figure 7:
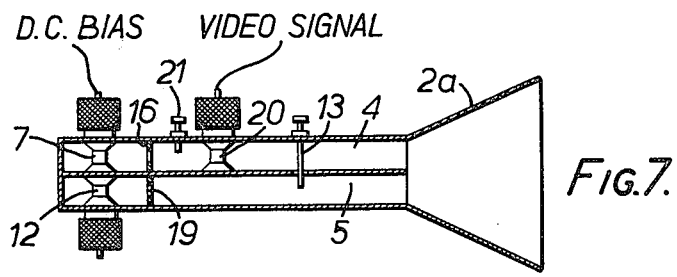

A form of transmitter/receiver unit for use in pairs in a communication link is shown in FIG. 7. The unit is similar to the unit of FIG. 6 and includes a Gunn diode 7, a detector diode 12 and a mixing post 13. The unit of FIG. 7 however differs in that the modulation of the carrier wave produced by the Gunn diode 7 is effected by means of a PIN diode 20. The diode 20 is fed with a modulating signal, for example a video signal from a t.v. camera, the effect of which is to modulate the resistance presented by the PIN diode to the waveguide 4. Consequently, the carrier wave fed to the antenna 2a along the waveguide 4 is modulated by the video signal. For maximum effect, the PIN diode 20 is preferably situated on an odd number of half wavelengths of the carrier wave in the guide from the plate 16. Also, the arrangement includes an adjustable post 21 for PIN diode matching purposes.

The unit of FIG. 7 can be used with advantage in a communication link to transmit signals from a t.v. camera at a remote location to a central location, and to transmit control signals from the central location to the camera. The arrangement thus can be used to control a remote t.v. camera used in a security system.

Figure 8:
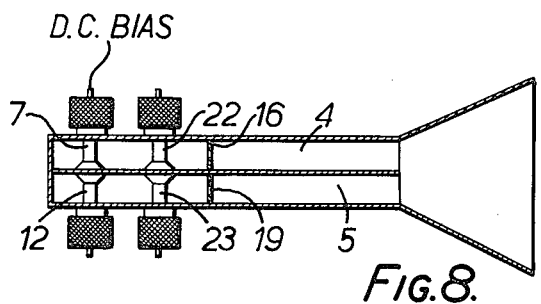

In the unit of FIG. 8, a different frequency modulation arrangement is provided. The unit includes a Gunn diode 7 in a tuned cavity partially closed by a plate 16 as previously described, the diode 7 being provided with a constant d.c. bias to produce microwave radiation. Also included in the cavity is a varactor diode 22. The modulating signal is applied to the varactor diode, and the effect of this is to vary the resonant frequency of the cavity and thereby modulate the frequency of operation of the diode so as to launch a frequency modulated microwave carrier into the transmitting waveguide 4.

In the receiving waveguide 5, a detector diode 12 is provided in a resonant cavity defined by a plate 19 as previously described, together with another varactor diode 23 for mixer tuning purposes. Those skilled in the art will appreciate that pairs of the units of FIG. 8 can be used in a communication link in much the same way as described with reference to FIG. 6.

Figure 9:
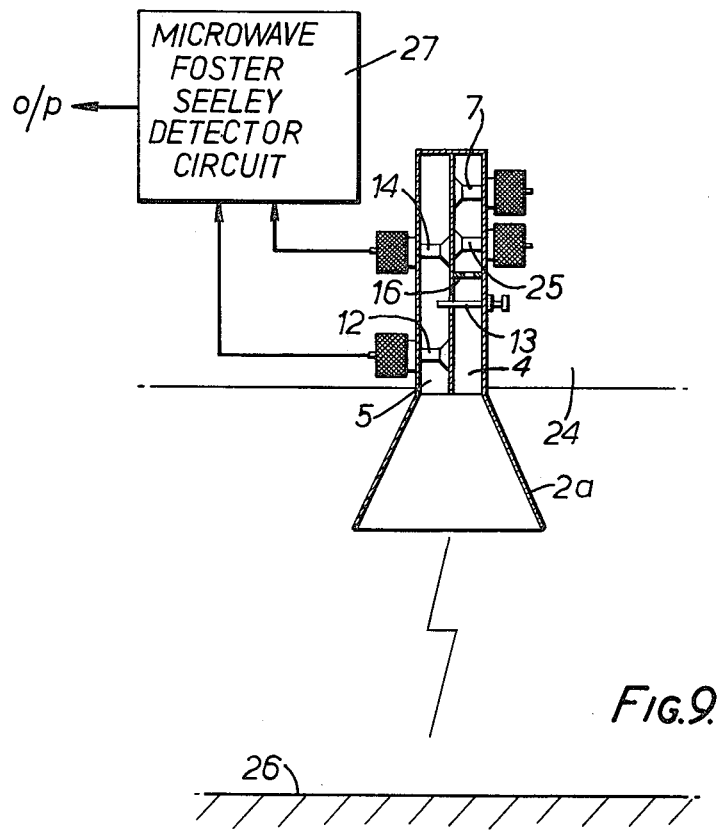
FIG. 9 illustrates the use of a transmitter/receiver unit of the invention as an aircraft altitude radar.

In FIG. 9 a unit of the invention is shown used as aircraft altitude radar. The unit is mounted downwardly on an aircraft 24 shown schematically, and includes a Gunn diode 7 within a resonant cavity defined by plate 16, together with a varactor diode 25. The Gunn diode 7 receives a constant d.c. bias and the varactor diode 25 receives a f.m. modulating signal. Thus, there is launched in the transmitting waveguide 4 a frequency modulated microwave carrier signal. The signal is reflected from the ground 26 and passes as a return into the receiving waveguide 5 where two detector diodes 12, 14 are disposed. Post 13 leaks the transmitted carrier into the waveguide 5 mid way between the diodes 12, 14, to be mixed with the received radar returns. The diodes 12, 14 are connected to a conventional microwave Foster Seeley circuit 27 for range detection, the operation of which is well known in the art and will not be described further.

Thus, from the foregoing, it will be appreciated that the invention has applications to many different situations in which a compact arrangement of a microwave transmitter and receiver are required to feed into a common aerial and where a high or controllable degree of isolation between the transmitter and receiver are required.

I claim:

1. A microwave transmitting and receiving device, comprising
   (a) an elongated hollow waveguide shell member open at one end and containing a chamber, said shell member having in vertical transverse cross section a rectangular configuration including opposed pairs of major and minor walls, respectively;
   (b) planar plate means arranged within said chamber between, parallel with, and spaced from said major walls, said plate means bisecting said chamber to define a pair of waveguides having the same dimensions, respectively;
   (c) microwave oscillator diode means arranged within one of said waveguides for transmitting radiation to said open end;
   (d) microwave detector diode means arranged within the other of said waveguides for receiving radiation from said open end; and
   (e) means for mounting said diode means within said pair of waveguides, respectively, said mounting means being connected with said plate means and said opposed major wall of said shell member, respectively, whereby radiation from said oscillator diode means is transmitted from said transmitting waveguide to said open end, and radiation is received by said detector diode means via said receiving waveguide.

2. Apparatus as defined in claim 1, wherein said plate means contains an aperture for transmitting microwave radiation from said transmitting waveguide to said receiving waveguide for heterodyning the device.

3. Apparatus as defined in claim 2, and further comprising post means connected with said shell member and extending transversely through said plate aperture.

4. Apparatus as defined in claim 3, wherein said post means is threadably connected with said shell member for selectively adjusting the position of said post means relative to said aperture, thereby to control the transmission of radiation from said transmitting waveguide to said receiving waveguide.

5. Apparatus as defined in claim 2, and further comprising second detector diode means arranged in said receiving waveguide and mounted on said plate means and said opposed major wall of said shell member, said first and second detector diode means being symmetrically arranged relative to said plate aperture.

6. Apparatus as defined in claim 1, and further comprising first divider means arranged within said transmitting waveguide normal to said plate means, said first divider means defining an oscillator resonant cavity for said microwave oscillator diode means, said first divider means further containing an aperture defining a radiation passage from said oscillator cavity to said shell member open end.

7. Apparatus as defined in claim 6, and further comprising first varactor diode means arranged within said oscillator resonant cavity and mounted on said plate means and said opposed major wall of said shell member.

8. Apparatus as defined in claim 7, and further comprising second divider means arranged within said receiving waveguide normal to said plate means, said second divider means defining a detector resonant cavity for each first microwave detector diode means, said second divider means further containing an aperture defining a radiation passage from said shell member open end to said detector cavity.

9. Apparatus as defined in claim 8, and further comprising second varactor diode means arranged within said detector resonant cavity and mounted on said plate means and said opposed major wall of said shell member.

10. Apparatus as defined in claim 6, and further comprising adjustable tuning post means arranged partially within said oscillator resonant cavity, said tuning post means being threadably connected with said shell member for selective vertical displacement within said oscillator resonant cavity.

11. Apparatus as defined in claim 1, and further comprising a horn antenna arranged adjacent said shell member open end.

12. Apparatus as defined in claim 1, and further including an antenna comprising a wedge-shaped block of dielectric material arranged adjacent said shell member open end.

13. Apparatus as defined in claim 1, wherein said shell member and said plate means are integrally extruded from a metallic material.

14. Apparatus as defined in claim 1, wherein said mounting means comprises
   (1) bush means mounted on said plate means; and
   (2) threaded cap and collar means mounted on said opposed major wall of said shell member.

15. A microwave transmitting and receiving device, comprising
   (a) an elongated hollow waveguide shell member open at one end and containing a chamber, said shell member having in vertical transverse cross section a rectangular configuration including opposed pairs of major and minor walls, respectively;
   (b) planar plate means arranged within said chamber between, parallel with, and spaced from said major walls, said plate means bisecting said chamber to define a pair of waveguides having the same dimensions, respectively;
   (c) microwave oscillator diode means arranged within one of said waveguides for transmitting radiation to said open end;
   (d) first microwave detector diode means arranged within the other of said waveguides for receiving radiation from said open end;
   (e) means for mounting said diode means within said pair of waveguides, respectively, said mounting means being connected with said plate means and said opposed major wall of said shell member, respectively;
   (f) divider means arranged within said transmitting waveguide normal to said plate means, said divider means defining a resonant cavity for said microwave oscillator diode means, said divider means further containing an aperture defining a radiation passage from said cavity to said shell member open end; and
   (g) PIN diode means mounted in said transmitting waveguide on the opposite side of said divider from said oscillator diode means, whereby radiation from said oscillator diode means is transmitted from said resonant cavity of said transmitting waveguide to said open end, and radiation is received by said detector diode means via said receiving waveguide.

* * * * *